F. W. KRUEGER.
HOSE COUPLING.
APPLICATION FILED AUG. 2, 1916.
1,250,325.
Patented Dec. 18, 1917.
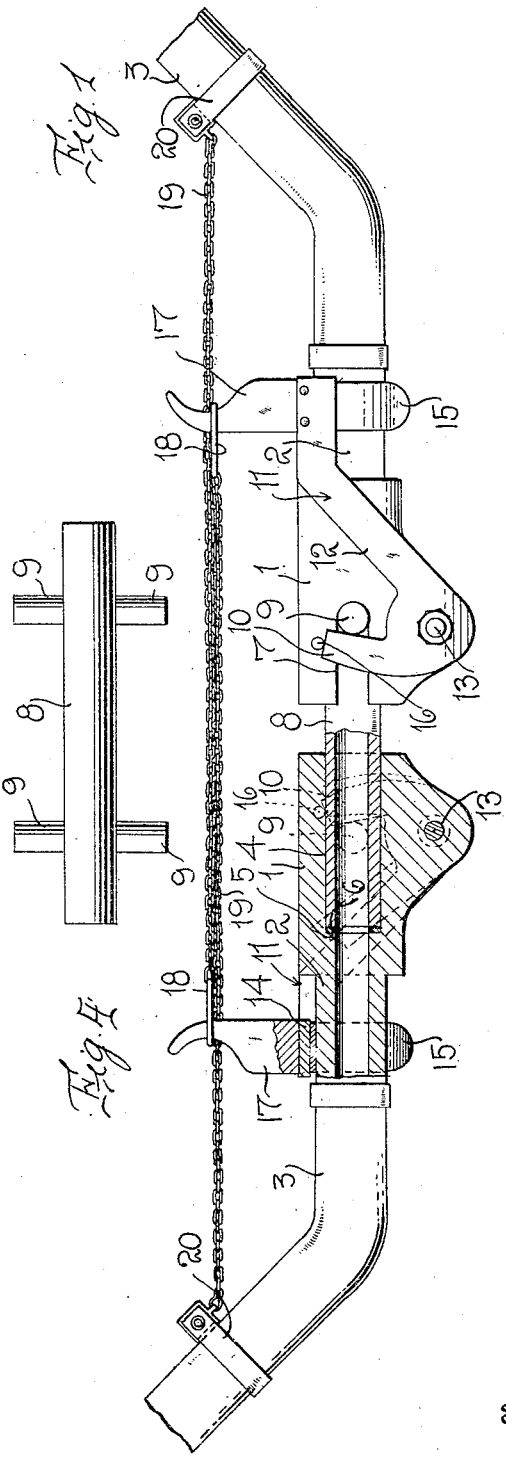
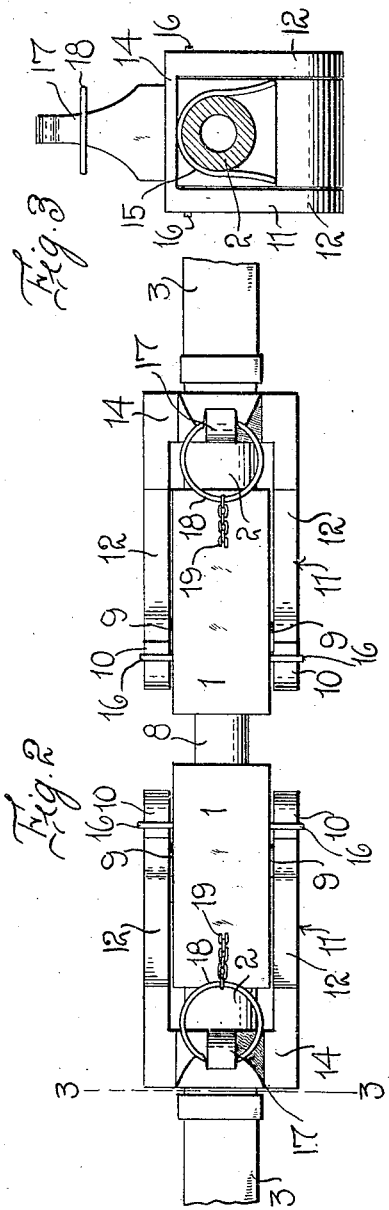
Inventor
F. W. Krueger.
By Watson E. Coleman
Attorney

UNITED STATES PATENT OFFICE.

FREDERICK W. KRUEGER, OF WACO, TEXAS.

HOSE-COUPLING.

1,250,325.  Specification of Letters Patent.  Patented Dec. 18, 1917.

Application filed August 2, 1916. Serial No. 112,792.

*To all whom it may concern:*

Be it known that I, FREDERICK W. KRUEGER, a citizen of the United States, residing at Waco, in the county of McLennan and State of Texas, have invented certain new and useful Improvements in Hose-Couplings, of which the following is a specification, reference being had to the accompanying drawings.

This invention comprehends certain new and useful improvements in pipe couplers, and relates particularly to a device of this kind designed especially for use in connection with steam hose of railway cars, or fire hose.

The invention has for its primary objects a practical, durable and efficient construction of hose coupler, the parts of which may be cheaply and easily manufactured and readily assembled and not liable to get out of order, and so arranged that the hose may be very quickly coupled together and securely held coupled, and also very easily uncoupled, means being provided whereby when the invention is used in connection with a steam hose, the two complemental parts of the coupler will be automatically disconnected when the cars are uncoupled one from the other.

And the invention also aims to generally improve devices of this class so as to render them more useful and commercially desirable.

With these and other objects in view, as will more fully appear as the description proceeds, the invention consists in certain constructions, arrangements and combinations of the parts that I shall more fully describe and claim.

For a full understanding of the invention, reference is to be had to the following description and accompanying drawings, in which Figure 1 is a side elevation of my improved pipe coupler, parts being shown in section, Fig. 2 is a top plan view of the device with parts broken away, Fig. 3 is a transverse sectional view on the line 3—3 of Fig. 2, and Fig. 4 is a detail view of one form of pipe section which may be employed.

Corresponding and like parts are referred to in the following description and designated in all of the views of the accompanying drawing by like reference characters.

Referring to the drawing, the numeral 1 designates the coupler head which is formed with a tubular shank 2 designed for engagement to the hose 3 in any desired way, the head being formed with a longitudinally extending bore 4 having at one point in its length an annular shoulder 5 against which a gasket 6 is adapted to abut. The bore 4 extends throughout the length of the head 1 and through the shank 2 at one end, and at its other end is intersected by longitudinally extending side recesses 7 arranged in transverse alinement with each other, and opening from the inner end of the head. The bore 4 is adapted to receive one end of a coupling pipe section 8 formed with laterally extending lugs 9 designed to fit into the side recesses 7 for engagement by hooks 10 formed on one end of a clamping member 11.

In the present embodiment of the invention, the clamping member 11 consists of two levers 12 on corresponding ends of which the hooks 10 are directly formed, said levers being pivotally mounted near the hooks, as at 13, on opposite sides of the head 1 and being connected together for simultaneous operation, at their other ends, by means of a cross bar 14 on which a substantially U-shaped spring clip 15 is mounted. This clip is designed to embrace and engage the shank 2, in order to securely hold the clamping member in its operative position with the hooks 10 thereof in engagement with the lugs 9, and preferably pins 16 project laterally from opposite sides of the head 1 for engagement with the hooks to limit the movement of the clamping member in one direction, although these pins are not essential, in view of the fact that this movement will also be limited by the full engagement of the spring clip 15 with the shank 2.

From as much of the description as has preceded, in connection with the different views of the accompanying drawing, it will be understood that on fire hose couplers only one of the coupler heads 1 will be necessary, and that the pipe which fits in said head will need the lugs 9 only at one end thereof. But assuming that the device is designed for use in connection with the steam hose of railway cars, it will be understood that the coupling pipe section 8 is a separate member; that two of the coupler heads and their concomitant parts are required, and that the pipe section 8 will be formed with lugs 9 at each end thereof, as clearly illustrated in the drawing.

Preferably the clamping members 11 are provided with recessed or hook-shaped lugs 17 which may be used as finger pieces for manipulating the clamping members; and when the invention is embodied in a steam hose coupler, these lugs 17 are engaged with rings or similar devices 18 carried by chains or flexible connecting members 19 secured by band clips 20 or the like to the hose sections 3, the chains crossing each other and engaging with the lug of the opposite clamping member, whereby when the cars are uncoupled, the chains will automatically, by engagement with the lugs 17, swing the clamping members 11 to their open or disengaging position so as to allow the coupler heads to freely disconnect and avoid any injury to the different parts.

It will thus be seen that I have provided a very practical, durable and efficient construction of hose coupler which will securely hold the parts in fixed relation so long as desired, and which may be very easily manipulated to connect and disconnect the hose sections and which, when used in connection with the steam hose of railway cars, may be so arranged as to automatically disconnect the coupler heads when the cars are uncoupled.

While the accompanying drawing illustrates what I believe to be the preferred embodiment of my invention, it is to be understood that the invention is not limited thereto, but that various changes may be made in the details of construction, arrangements and proportions of the parts without departing from the scope of the appended claim.

What is claimed, is:

A hose coupler comprising a head formed with a longitudinal bore, and a recess intersecting the bore at one end, a pipe section receivable in said bore and provided with a laterally projecting lug receivable in said recess, a lever pivotally mounted on the head and having a hook adapted to swing across the recess back of the lug, for the purpose specified, a spring clip carried by said lever and engageable with the head to hold the lever in its operative position, and a laterally directed pin carried by the head and with which the free end of the hook portion of the lever is adapted to engage and a hook shaped lug carried by the lever adjacent the clip and extending in a direction away from the clip.

In testimony whereof I hereunto affix my signature in the presence of two witnesses.

FREDERICK W. KRUEGER.

Witnesses:
L. R. RODGERS,
H. F. ENGELKE.

Copies of this patent may be obtained for five cents each, by addressing the "Commissioner of Patents, Washington, D. C."